United States Patent [19]

Nakano et al.

[11] Patent Number: 5,090,392
[45] Date of Patent: Feb. 25, 1992

[54] CONTROL SYSTEM FOR ENGINE WITH SUPERCHARGER

[75] Inventors: Toru Nakano; Koichi Hatamura; Tsuyoshi Goto, all of Hiroshima, Japan

[73] Assignee: Mazda Motor Corporation, Hiroshima, Japan

[21] Appl. No.: 537,452

[22] Filed: Jun. 14, 1990

[30] Foreign Application Priority Data

Jun. 14, 1989 [FR] France ............... 1-150791

[51] Int. Cl.$^5$ .................................. F02B 33/36
[52] U.S. Cl. .................................. 123/564; 417/310; 418/201.2
[58] Field of Search ............... 123/559.1, 564; 417/310; 418/201.2

[56] References Cited

U.S. PATENT DOCUMENTS

| | | | |
|---|---|---|---|
| 2,519,913 | 8/1950 | Lysholm | 418/201.2 |
| 4,498,849 | 2/1985 | Schibbye et al. | 417/310 |
| 4,826,412 | 5/1989 | Kubo et al. | 418/201.2 |
| 5,003,957 | 4/1991 | Takeda | 123/564 |

FOREIGN PATENT DOCUMENTS

| | | | |
|---|---|---|---|
| 335413 | 10/1989 | European Pat. Off. | 123/564 |
| 635823 | 1/1928 | France | 123/564 |
| 48929 | 3/1987 | Japan | 123/564 |

*Primary Examiner*—Michael Koczo
*Attorney, Agent, or Firm*—Fleit, Jacobson, Cohn, Price, Holman & Stern

[57] ABSTRACT

A mechanical supercharger of an internal combustion engine has a housing formed with inlet and outlet ports and a pair of spiral screws rotatably received in the housing for partially compressing air introduced in the mechanical supercharger and carrying it from the inlet port to the outlet port. The supercharger is disposed after a throttle valve in an intake system of the engine, and is provided with a relief port allowing compressed air to be relieved from the supercharger. The relief port is formed in the housing between the inlet and outlet ports where air is compressed to allow compressed air to be relieved. A relief valve is controlled to variably open according to engine operating conditions and relieve compressed air in the supercharger.

7 Claims, 6 Drawing Sheets

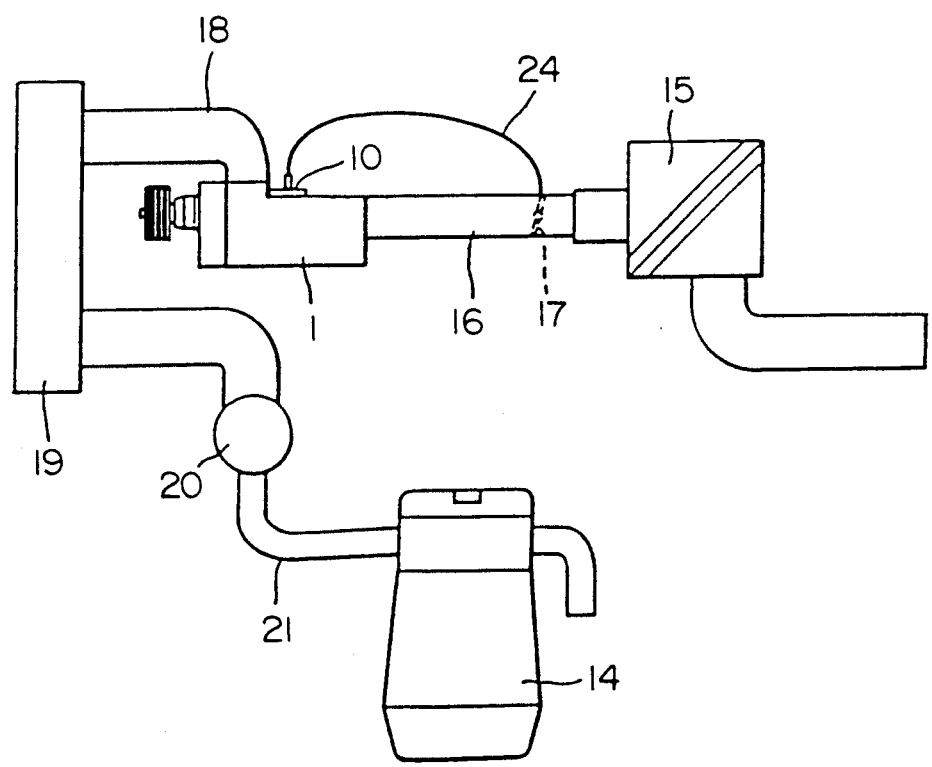

CONTROL SYSTEM FOR ENGINE WITH SUPERCHARGER

FIELD OF THE INVENTION

The present invention relates to an engine control system and, more particularly, to a control system for an internal combustion engine having a mechanical supercharger causing internal compression of intake air.

BACKGROUND OF THE INVENTION

It is known to improve the charging efficiency of an internal combustion engine by means of a supercharger, such as a mechanical supercharger. A mechanical supercharger of the type having screws, in which intake air is compressed, is advantageous, due to its high volumetric and heat insulation efficiency. Such a screw type supercharger, however, has been found to lose its pumping power due to internal compression when the internal combustion engine operates with a low, or only partial, load.

To decrease such a loss of pumping power, or pump loss, in a screw type supercharger of the type which is used in combination with turbochargers, a valve, slidable in a direction of the central axis of rotation of the screw type supercharger, has been used to variably change the size of an opening of an intake port of the screw type supercharger. An effective stroke of the screw type supercharger is thereby shortened when the internal combustion engine operates with a low load. Such a screw type supercharger is known from, for example, Japanese Unexamined Patent Application No. 63(1988)-170524.

In general, in an internal combustion engine with a supercharger, it is necessary to provide a relief mechanism for relieving the supercharger in order to restrict its maximum supercharging pressure. Previously, however, the provision of such a relief mechanism, in addition to a mechanism for regulating the effective stroke of the supercharger, has made the screw type supercharger complex in structure.

SUMMARY OF THE INVENTION

It is, therefore, a primary object of the present invention to provide an engine control system for an automobile internal combustion engine with a mechanical supercharger which enables the supercharger to decrease its pump loss when the engine operates at low operating speeds.

It is another object of the present invention to provide an engine control system for an automobile internal combustion engine with a mechanical supercharger which eliminates providing the supercharger with a separate relief mechanism for restricting a maximum supercharging pressure.

Such objects are achieved by the use of an engine control system which is adapted to control a mechanical supercharger which has a pair of spiral screws rotatably received in the housing thereof, the housing being formed with inlet and outlet ports. The supercharger is disposed after a throttle valve in an intake system of the internal combustion engine to partially compress intake air introduced in the mechanical supercharger and carry it from the inlet port to outlet port. A relief port is formed in the housing between the inlet and outlet ports at a location in the supercharger where the intake air is compressed. The relief port is opened and closed by valve means so as to allow the compressed intake air to be relieved. The relief valve is controlled by control means to variably open the relief port according to variable engine operating conditions.

The control means includes an actuator connected to the valve means. The actuator operates, according to either negative pressure created after or behind the throttle valve in the intake system or to the motion or position of the throttle valve, to move the relief valve, thereby opening or closing the relief port. Both the changes in negative pressure after the throttle valve and the changes in motion or position of the throttle valve itself result from changes in engine load.

BRIEF DESCRIPTION OF THE DRAWINGS

The above and other objects and features of the present invention will be apparent from the following description of preferred embodiments when considered in conjunction with the appended drawings, in which the same or similar parts are designated by the same reference numerals throughout the several drawings, and wherein:

FIG. 8 is a schematic illustration showing an internal combustion engine control system in accordance with a further preferred embodiment of the present invention.

DESCRIPTION OF THE PREFERRED EMBODIMENTS

Figure 1:
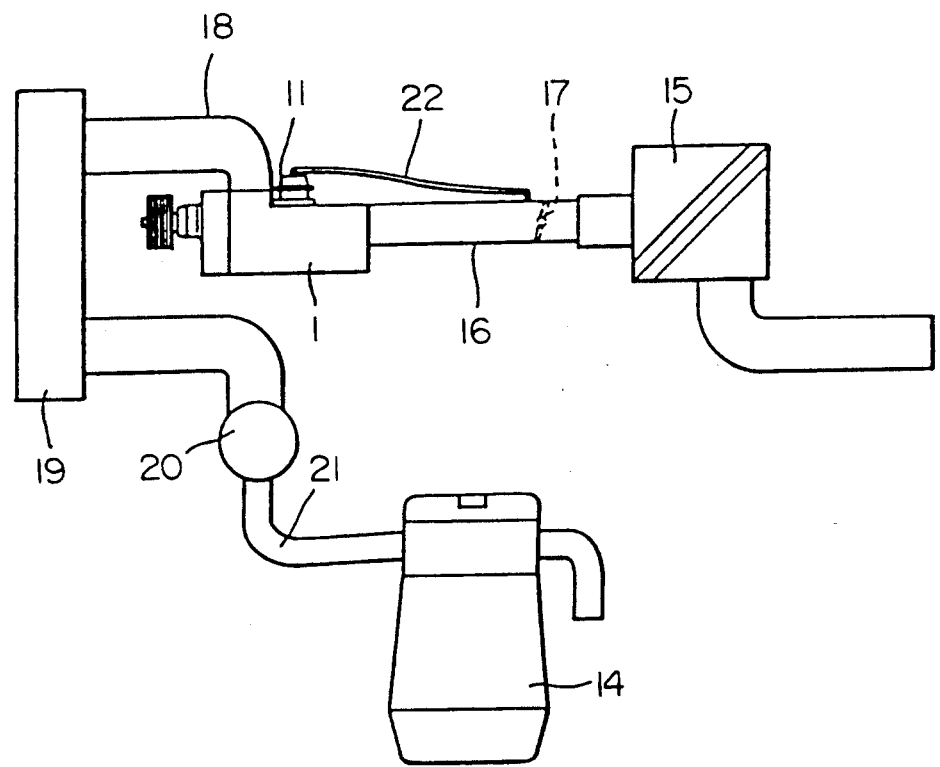
FIG. 1 is a schematic illustration showing an internal combustion engine control system in accordance with a preferred embodiment of the present invention.
Figure 2:
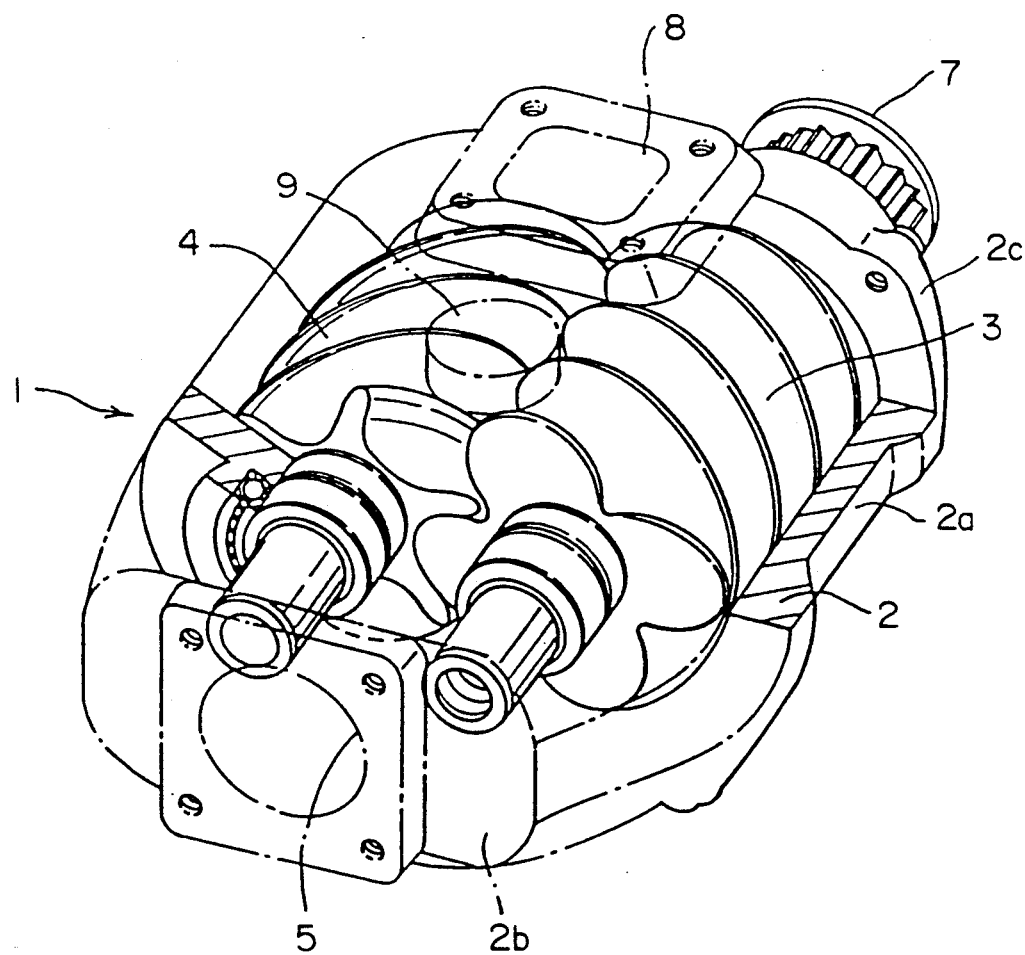
FIG. 2 is a perspective view of a screw type supercharger, with its housing partially cut away, used in the internal combustion engine control system shown in FIG. 1.
Figure 3:
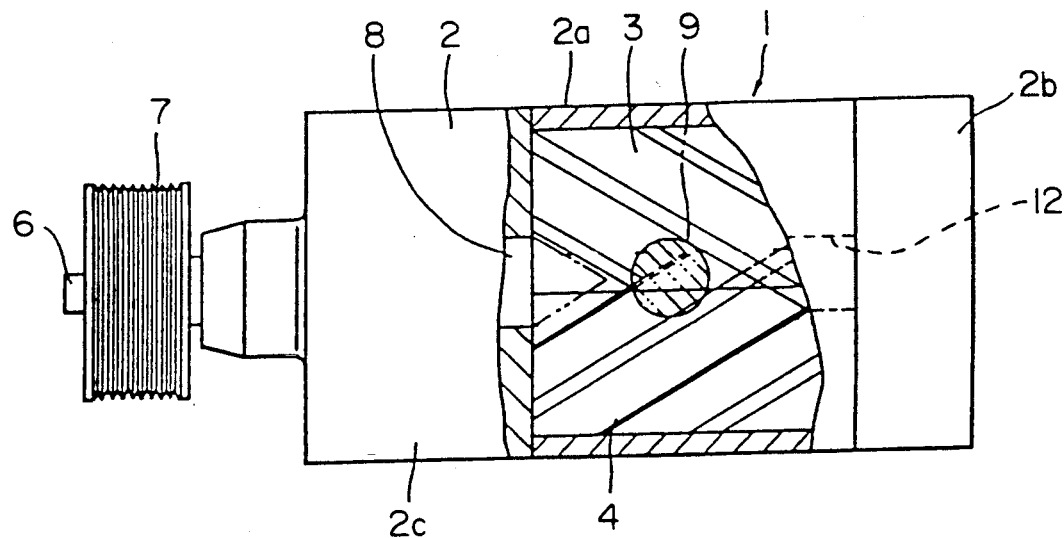
FIG. 3 is a plan view of the screw type supercharger shown in FIG. 2, with its housing partially cut away.
Figure 4:
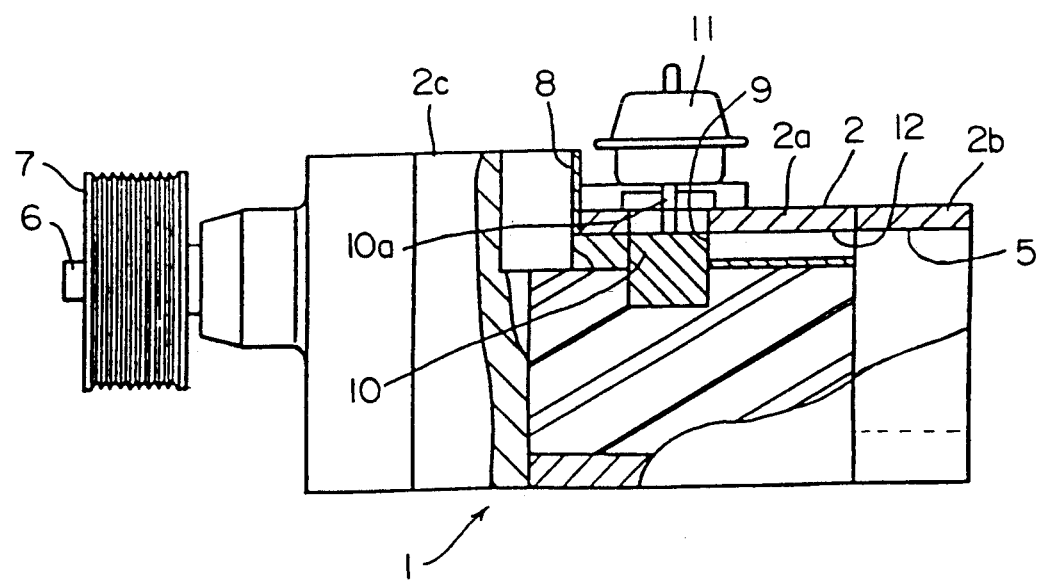
FIG. 4 is a side view of the screw type supercharger shown in FIG. 2, with its housing partially cut away.
Figure 5:
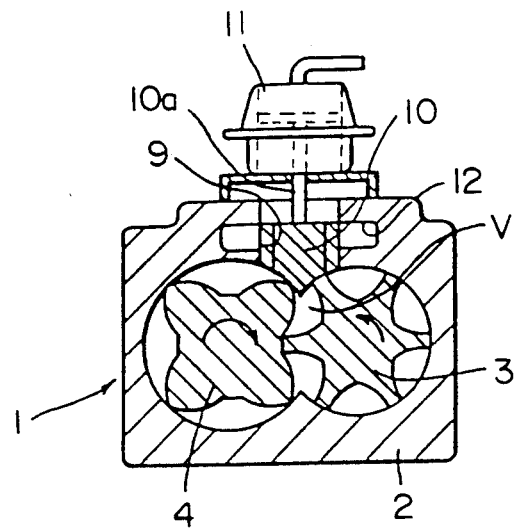
FIG. 5 is a cross-sectional view of FIG. 2.

Referring to the drawings in detail, and in particular to FIG. 1, an internal combustion engine control system in accordance with a preferred embodiment of the present invention is shown, and includes an internal combustion engine 14 and a mechanical supercharger 1, which is a screw type supercharger (engine 14 and supercharger 1 are hereinafter referred to simply as an engine and a supercharger, respectively). An intake system of the engine has an air cleaner 15 and a first or upstream intake pipe 16 connected at its one or upstream end to the air cleaner 15. The upstream intake pipe 16 is connected at its other or downstream end to a port (which is shown as an inlet port 5 in FIG. 2) of the supercharger 1. In the upstream intake pipe 16, a throttle valve 17 is disposed after, or downstream of, the air cleaner 15. The supercharger 1 is provided with a port (which is shown as an outlet port 8 in FIG. 2 or 4) to which a second or downstream intake pipe 18 leading to a surge tank 19, is connected at its one or upstream end. An intake manifold 20, which is connected to surge tank 19 by yet another pipe, communicates with the other or downstream end of the downstream intake pipe 18. Intake manifold 20 is separately communicated with cylinders of the engine 14 by way of discrete intake pipes 21 which are relatively short in length.

A negative pressure operating actuator 11, which will be described later, is connected to the upstream intake pipe 16 after the throttle valve 17 by way of a connecting pipe 22. This actuator 11 is controlled in operation by negative pressure created according to openings or positions of the throttle valve 17.

Referring to FIGS. 2 to 5, the supercharger 1 has a housing 2 for rotatably receiving therein two screws 3 and 4. The housing 2 comprises a center housing 2a and front or first and rear or second end housings 2b and 2c which are fixed to the ends of the center housing 2a by, for example, bolts in an airtight manner. The two screws 3 and 4 are disposed parallel to each other in the space between the center housing 2a and front and rear end housings 2b and 2c, and are connected by gearing (not shown) so as to rotate in opposite directions as shown by arrows in FIG. 5. A drive shaft 6 is fixed to one of the screws, for example in this embodiment the screw 3, and extends and projects from the housing 2a through the rear end housing 2c. A pulley 7 is coaxially fixed on the end of the part of the shaft 6 projecting from the housing 2. The pulley 7 is connected or coupled to drive means, for example a crankshaft (not shown) of the engine 14, by a belt which transmits the engine output to drive the pulley 7.

The housing 2 is formed with an inlet port 5 extending parallel to and above the center axes of rotation of the screws 3 and 4 through the front end housing 2b. The housing 2 is further formed with a cylindrical outlet port 8 extending upward perpendicularly to the center axes of rotation of the screws 3 and 4. The outlet port 8 consists of two halves or portions, one half or portion being formed in the end part of the center housing 2a adjacent to the rear end housing 2c and the other half or portion in the part of the rear end housing 2c adjacent to the center housing 2a. Intake air seized and drawn through the inlet port 5 by the screws is carried over and above a plane including the parallel axes of rotation of the screws 3 and 4 and discharged out of the opposite side of the housing through the outlet port 8.

Figure 6:
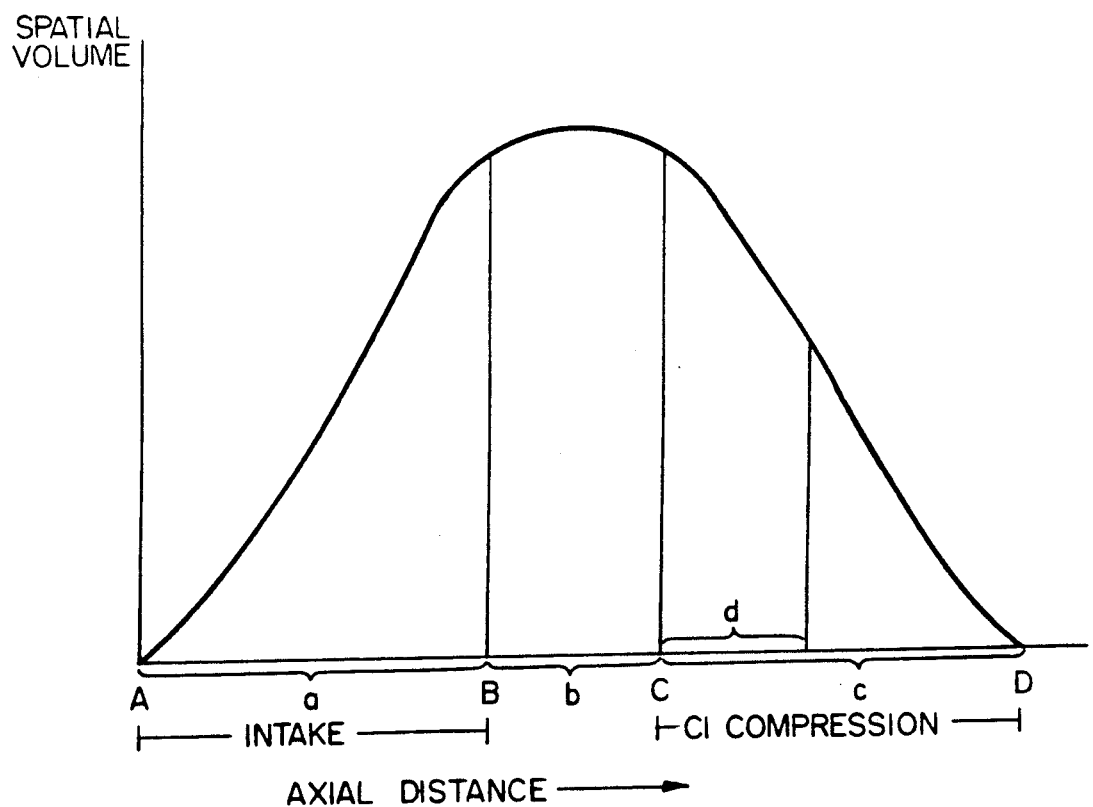
FIG. 6 is a diagram showing the internal compression characteristics of the screw type supercharger shown in FIG. 2.

Internal compression of the intake air carried in the supercharger 1 takes place as is illustrated by the diagram in FIG. 6, wherein the y axis of the diagram represents the spatial volume V between the two screws 3 and 4 and the x axis of the diagram represents the axial distance from the front end towards the rear end of the screws 3 and 4. As is apparent from the diagram, the spatial volume increases sharply at first to a certain volume in a distance range a between axial distances A and B, changes gradually increasingly and then decreasingly in a distance range b between axial distances B and C, and finally decreases sharply in a distance range c between axial distances C and D. Intake air is introduced in the distance range a between axial distances A and B and is compressed in the distance range c between axial distances C and D.

To relieve compressed air from the supercharger 1, the housing 2, and in particular the center housing 2a of the supercharger 1, is formed, at the middle of the housing 2, with a cylindrical relief port 9 which extends vertically relative to the axes of rotation of the screws 3 and 4 and covers a distance range d defined between axial distances C and C1 within the distance range c.

The cylindrical relief port 9 communicates with a relief passage 12 extending between the relief port 9 and the inlet port 5. In the relief port 9, relief valve 10, having a cylindrical base and a wedge shaped end, is snugly received to move up and down and alternately communicate the relief passage 5 with and isolate the relief passage 5 from the space in the supercharger 1. The relief valve 10 is connected or coupled to the negative pressure operated actuator 11 by a stem 10a extending vertically from the relief valve 10. The actuator 11 is activated by the negative pressure created in the upstream intake pipe 16, which is applied to the actuator 11 by the correcting pipe 22. Actuator 11 is of conventional construction, and may be formed, for example, by a piston and cylinder construction dividing actuator 11 into an upper chamber of variable pressure and a lower chamber of substantially constant (e.g., atmospheric) pressure, as is illustrated schematically in FIG. 5. However, any desired negative pressure actuator construction may be used, so long as the negative pressure produced in the upstream intake pipe 16 moves the relief valve 10 up. As the relief valve 10 moves up, the opened area between the relief port 9 and the end of the relief passage 12 is increased, as a result of the wedge shaped end of the relief valve 10. Thus, the intake air in the supercharger 1 is partially relieved in response to the negative pressure created in the upstream intake pipe 16, according to the opening or position of the throttle valve 17.

In more detail, when the engine 14 operates in low load conditions and the throttle valve 17 is in its idle position, the pressure of intake air in the upstream intake pipe 16 becomes more negative, i.e, becomes increasingly lower, and the actuator 11 moves the relief valve 10 up through a large stroke, thereby widening the opening at the end of the relief passage 12 so as to increase the amount of compressed intake air relieved from the supercharger 1 through the relief passage 12 and back to port 5. Accordingly, the pumping loss of supercharger 1 is decreased when the engine operates in low load conditions. In contrast, when the throttle valve 17 opens extensively, the actuator 11 causes no motion of relief valve 10, thereby maintaining the relief passage 12 closed. The supercharger 1 is therefore brought into a supercharging condition so as to carry a large volume of compressed intake air out through the outlet port 8 and into the downstream intake pipe 18. Actuator 11 therefore controls the relief valve 10 so as to open the relief port 9 wider as engine load decreases and less as engine load increases.

Figure 7:
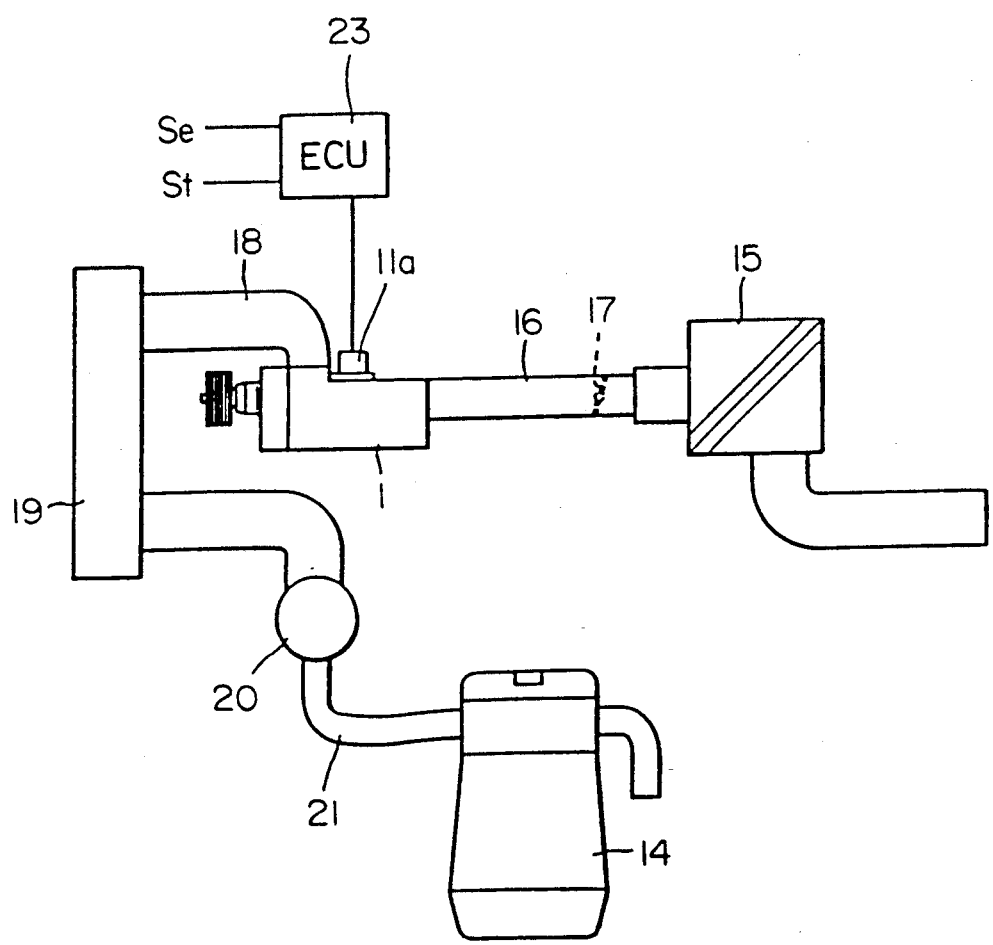
FIG. 7 is a schematic illustration showing an internal combustion engine control system in accordance with another preferred embodiment of the present invention.

Referring to FIG. 7, shown therein is an engine control system in accordance another preferred embodiment of the present invention wherein a step motor 11a is incorporated in the system in place of the negative pressure operated actuator 11 of the previously described embodiment shown in FIGS. 1 to 5 to move the relief valve 10. Operation of this step motor 11a is controlled by a control unit 23, mainly comprising a microcomputer. The control unit 23 receives signals, representative of engine speed Se and throttle opening or position St, respectively, to provide the step motor 11a with a control signal so as to operate it, and consequently operate relief valve 10, stepwise. Such signals may be provided by any one of a variety of well known speed sensors and throttle opening or position sensors, respectively. It is possible, if desired, to send a signal representative of the supercharging pressure of the supercharger 1 so as to relieve intake air in order to feedback control a maximum supercharging pressure of the supercharger 1.

Referring to FIG. 8, shown therein is an engine control system in accordance with a further preferred embodiment of the present invention wherein a linkage 24 is used, in place of the negative pressure operated actuator 11 or the step motor 11a of the previous embodiment, to interconnect or operationally couple the relief valve 10 and throttle valve 17, or its driving means, together in order to move the relief valve 10. The motion of the throttle valve 17 or its driving means is, in this embodiment, transformed into linear movement and transmitted to the relief valve 10.

It is to be understood that although the invention has been described in detail with respect to preferred embodiments, various other embodiments and variants are possible which are within the spirit and scope of the invention, and such embodiments and variants are intended to be covered by the following claims.

What is claimed is:

1. An engine control system for controlling an internal combustion engine with a mechanical supercharger disposed after a throttle valve in an intake system of internal combustion engine, said mechanical supercharger having a housing formed with inlet and outlet ports and a pair of spiral screws rotatably received in said housing for compressing air introduced in said mechanical supercharger and carrying it from said inlet port to said outlet port, wherein:

said housing includes a relief port for allowing compressed air to be relieved from said supercharger formed in said housing between said inlet and outlet ports, said relief port located in a portion of said housing where said air is compressed, said engine control system comprising said relief port, valve means for opening and closing said relief port, and control means for controlling said valve means to variably open said relief port according to engine operating conditions.

2. An engine control system as defined claim 1, wherein said control means controls said valve means to open said relief port wider as engine load decreases and less as engine load increases.

3. An engine control system as defined in claim 2, wherein said control means includes an actuator connected to said valve means to be actuated by negative pressure created after said throttle valve in said intake system to open said relief port.

4. An engine control system as defined in claim 1, wherein said relief port communicates with said inlet port by an axial passage formed in said housing.

5. An engine control system as defined in claim 1, wherein said control means includes an actuator connected to said valve means and actuated in accordance with motion of said throttle valve to open said relief valve.

6. An engine control system as defined in claim 5, wherein said actuator is a step motor driven stepwise according to motion of said throttle valve.

7. An engine control system as defined in claim 5, wherein said actuator is a linkage transmitting motion of said throttle valve to said relief valve.

* * * * *